# United States Patent Office 2,963,980
Patented Dec. 13, 1960

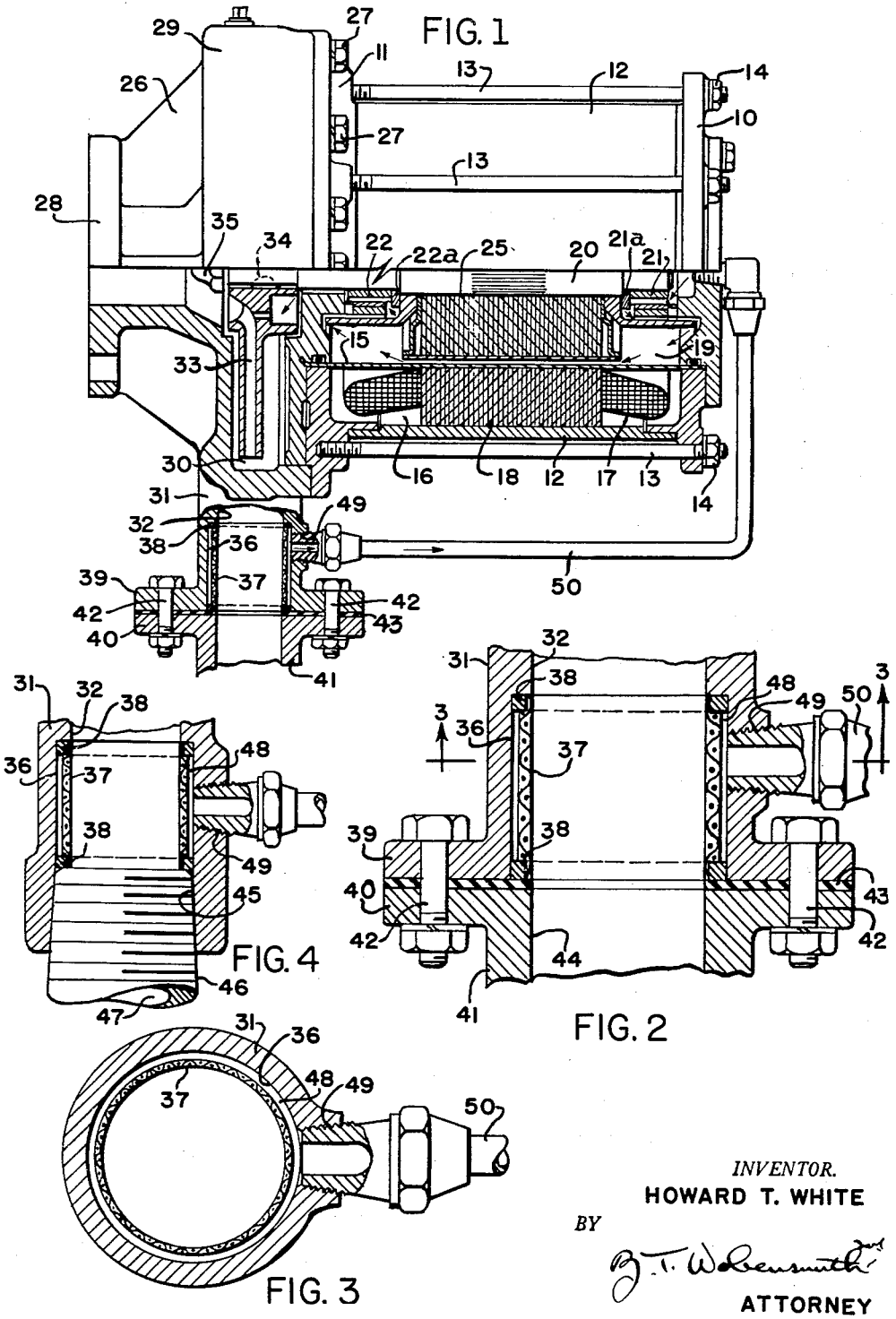

2,963,980
FLUID TAKE OFF CONNECTIONS FOR MOTOR DRIVEN PUMPS AND THE LIKE

Howard T. White, Melrose Park, Pa., assignor to Fostoria Corporation, Fostoria, Ohio, a corporation of Ohio Filed May 3, 1957, Ser. No. 656,928

4 Claims. (Cl. 103—111)

This invention relates to fluid take off connections for motor driven pumps and the like.

It has heretofore been proposed to tap off a portion of the high pressure fluid from a motor driven pump and return the same to the pump inlet through the bearings and around the rotor for lubrication and cooling. One arrangement for this purpose is shown in my prior Patent No. 2,741,990.

Such arrangements are satisfactory where clean fluid is being pumped. If slurries are required to be pumped it has heretofore been considered advisable to provide a filter inserted in the pipe connection from the pump scroll to the bearings, or to use a separate source of clean fluid. This results in unnecessary structural complication without sufficient compensating advantages.

It is the principal object of the present invention to provide a fluid take off connection which is simple in construction, easy to install, and reliable in its action.

It is a further object of the present invention to provide a fluid take off connection which avoids costly filters heretofore required.

It is a further object of the present invention to provide a fluid take off connection, particularly adapted for use in the high pressure or outlet connection of a pump, having a filter or screen incorporated therein so that the clean liquid can be easily separated from slurries and the like for delivery to any desired location where clean liquid is desired.

Other objects and advantageous features of the invention will be apparent from the description and claims.

The nature and characteristic features of the invention will be more readily understood from the following description, taken in connecting with the accompanying drawings forming part thereof, in which:

Figure 1 is a view partly in elevation and partly in longitudinal section of a motor driven pump having a fluid take off connection in accordance with the invention applied thereto;

Fig. 2 is an enlarged sectional view showing the details of the fluid take off connection;

Fig. 3 is a sectional view taken approximately on the line 3—3 of Fig. 2; and

Fig. 4 is a view similar to Fig. 2 showing another form of the invention.

It should, of course, be understood that the description and drawings herein are illustrative merely, and that various modifications and changes can be made in the structure disclosed without departing from the spirit of the invention.

Referring now more particularly to the drawings, for purposes of illustration a motor driven pump of the type shown in my prior U.S. Patent No. 2,741,990, is shown, with the fluid take off in accordance with the invention applied thereto.

The motor driven pump is shown as including end frame plates 10 and 11 connected by an outer cylindrical housing 12, held in assembled relation by bolts 13 and nuts 14, and with an inner cylindrical sleeve 15 of non-magnetic responsive material, secured in fluid tight relation to the end plates 10 and 11 to separate a fluid tight motor stator chamber 16 in which field windings 17 and laminated field pieces 18 are disposed.

Within the interior of the sleeve 15 a motor rotor chamber 19 is provided. A shaft 20 is rotatably supported in spaced bearings 21 and 22, and by thrust bearings 21a and 22a, and intermediate the bearings 21a and 22a an enclosed motor rotor 25, preferably of the short circuited type, is secured to the shaft 20. The periphery of the motor rotor 25, as illustrated in the drawings has a clearance with respect to the inner cylindrical sleeve 15, to permit of fluid flow therebetween, as shown and described in my prior Patent No. 2,741,990.

On the end plate 11, an impeller housing 26 is secured in fluid tight relation by bolts 27.

The impeller housing 26 has a central axial fluid inlet connection 28, a scroll 29 with an impeller chamber 30 therein and a fluid delivery connection 31 with a bore or passageway 32 connected to the impeller chamber 30 for fluid discharge.

The shaft 20 extends into the impeller chamber 30 and has an impeller 33 of any desired type secured thereto for rotation thereby, a key 34 and closed end nut 35 being suitable.

In accordance with the present invention the fluid delivery connection 31 is counterbored or enlarged for a portion of its length as at 36, coaxial with the bore 32, and has disposed therein a tubular foraminous screen 37 secured by welding or the like to external end rings 38. The screen 37 is preferably of substantially the same length as the length of the counterbore 36, and has an internal diameter substantially the same as that of the passageway or bore 32, so as to be in axial and interior surface alignment therewith.

The screen 37 and rings 38 can be of any desired material, resistant to or not subject to corrosion by the liquid being pumped and for this purpose can be of stainless steel, synthetic plastic, or the like. The mesh or size of openings in the screen 37 will be determined by the particle size of the solids in the slurry being pumped.

The sleeve 37 is held in the bore 36 in any desired manner. As shown in Figs. 1, 2 and 3, the fluid delivery connection 31 has a flange 39 to which a flange 40 of a fluid connection 41 is connected by bolts 42 with an interposed gasket 43. The fluid connection 41 has an internal bore or passageway 44 of substantially the same diameter as that of the passageway 32 and serves by its engagement with the adjacent ring 38 to hold the screen 37 in place.

As shown in Fig. 4, the fluid delivery connection 31 has an internally threaded portion 45 for the reception of the threaded end of a pipe 46, the inner marginal edge of which serves by its engagement with the adjacent ring 38 to hold the screen 37 in place. The internal diameter of the pipe 46 is preferably substantially the same as those of the screen 37 and the passageway 32 and provides an interior passageway 47.

The spacing of the screen 37 from the passageway 36 provides a fluid chamber 48 with which a threaded bore 49 is in communication for the connection of a delivery pipe 50.

The pipe 50 can be connected to any desired location for the delivery of clean liquid with the solids separated therefrom. As illustrated in Fig. 1, the pipe 50 can be connected to and through the end plate 10 for the delivery of liquid to the motor rotor chamber 19 for lubricating the bearings 21, 21a, 22 and 22a, for cooling the motor rotor 25 by passing therearound, and for cooling the interior of the motor rotor chamber 19 by contact with the interior of the sleeve 15. From the motor rotor chamber 19 the fluid is returned past the bearings 22a and 22, through the central opening in the end plate 11 to the impeller chamber and through openings in the impeller 32 to the inlet connection. The bearings 21 and 22 are provided with longitudinal axial grooves as shown and described in my prior Patent No. 2,741,990.

The liquid to be pumped, such as a slurry or the like, containing solids entrained or carried therewith, at the fluid inlet connection 28, is delivered by the impeller 33 with increased velocity to the fluid delivery connection 31, upon rotation of the shaft 20 by the field set up in the stator windings 17 and field pieces 18 and effective on the motor rotor 25.

This liquid, at increased velocity, passes through the passageway 32, and the interior of the screen 37, through which a portion can be withdrawn free from solids to the chamber 48 and thence through the pipe 50 for use. The flow of the main body of the fluid being pumped through the fluid connection 31 and through the fluid connection 41 (Figs. 1, 2 and 3), or the pipe 46 (Fig. 4), by reason of its velocity has a self cleaning effect and prevents the lodgment or collection of solid particles on the interior face of the screen 47. This self cleaning action is facilitated by the size relation described among the screen 47, the passageway 32, and the passageways 44 and 47.

I claim:

1. A fluid take-off connection comprising a liquid impelling source, a tubular fluid conducting member connected to said liquid impelling source, said member having an inner fluid passageway of predetermined diameter and an outer coaxially aligned fluid passageway of larger diameter extending therefrom, a tubular foraminous member open at both ends in said outer passageway having externally disposed end rings at the inner and outer ends of said outer passageway, the space between the exterior of said foraminous member and the interior surface of said outer passageway providing a fluid take-off chamber, and a fluid take-off connection in communication with said chamber.

2. A fluid take-off connection comprising a liquid impeller source, a tubular fluid conducting member connected to said liquid impelling source, said member having an inner fluid passageway of predetermined diameter and an outer coaxially aligned fluid passageway of larger diameter extending therefrom, a tubular foraminous member open at both ends in said outer passageway having externally disposed end rings at the inner and outer ends of said outer passageway, the internal surface of said foraminous member being aligned with the internal surface of said inner passageway, the space between the exterior of said foraminous member and the interior surface of said outer passageway providing a fluid take-off chamber, and a fluid take-off connection in communication with said chamber.

3. A fluid take-off connection comprising a liquid impelling source, a tubular fluid conducting member connected to said liquid impelling source, said member having an inner fluid passageway of predetermined diameter and an outer coaxially aligned fluid passageway of larger diameter extending therefrom, a tubular foraminous member open at both ends in said outer passageway in spaced relation thereto, the space between the exterior of said foraminous member and the interior surface of said outer passageway providing a fluid take-off chamber, a fluid take-off connection in communication with said chamber, and a second fluid conducting member connected to said first fluid conducting member, said second fluid conducting member having a fluid passageway axially aligned with and of substantially the same diameter as said foraminous member, said second fluid conducting member having a portion engaging said foraminous member for retaining it in position in said outer passageway.

4. A fluid take-off connection comprising a liquid impelling source, a tubular fluid conducting member connected to said liquid impelling source, said member having an inner fluid passageway of predetermined diameter and an outer coaxially aligned fluid passageway of larger diameter extending therefrom, a tubular foraminous member open at both ends in said outer passageway having externally disposed end rings at the inner and outer ends of said outer passageway, the internal surface of said foraminous member being aligned with the internal surface of said inner passageway, the space between the exterior of said foraminous member and the interior surface of said outer passageway providing a fluid take-off chamber, a fluid take-off connection in communication with said chamber, and a second fluid conducting member connected to said first fluid conducting member said second fluid conducting member having a fluid passageway axially aligned with and of substantially the same diameter as said foraminous member, said second fluid conducting member having a portion engaging said foraminous member for retaining it in position in said outer passageway.

References Cited in the file of this patent

UNITED STATES PATENTS

| 1,257,793 | Bodinson | Feb. 26, 1918 |
| 1,500,607 | Conant | July 8, 1924 |
| 1,973,070 | Hess et al. | Sept. 11, 1934 |
| 2,606,501 | Dreibelbis | Aug. 12, 1952 |
| 2,741,990 | White | Apr. 17, 1956 |
| 2,868,382 | Best | Jan. 13, 1959 |

FOREIGN PATENTS

| 619,722 | Great Britain | Mar. 14, 1949 |